(12) United States Patent
Nolan et al.

(10) Patent No.: US 10,134,261 B1
(45) Date of Patent: Nov. 20, 2018

(54) METHOD AND APPARATUS FOR VEHICULAR ITEM TRACKING

(71) Applicant: Ford Global Technologies, LLC, Dearborn, MI (US)

(72) Inventors: John Nolan, Canton, MI (US); Ryan Jones, Canton, MI (US); Marcellus Benedict Diederich, II, Livonia, MI (US); Adam Weiss, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/801,819

(22) Filed: Nov. 2, 2017

(51) Int. Cl.
*G08B 21/24* (2006.01)
*B60Q 1/50* (2006.01)

(52) U.S. Cl.
CPC ............. *G08B 21/24* (2013.01); *B60Q 1/50* (2013.01)

(58) Field of Classification Search
CPC .................................. G08B 21/24; B60Q 1/50
See application file for complete search history.

(56) References Cited

U.S. PATENT DOCUMENTS

| 2012/0282906 A1* | 11/2012 | Frye ..................... H04W 4/04 455/414.2 |
| 2015/0061856 A1* | 3/2015 | Raman ..................... B60Q 9/00 340/457 |
| 2015/0077253 A1* | 3/2015 | Spahl .................. G07C 9/00182 340/568.1 |
| 2015/0177362 A1* | 6/2015 | Gutierrez .............. B60R 25/245 701/519 |
| 2017/0048376 A1 | 2/2017 | Logan |

OTHER PUBLICATIONS

Tile and Jaguar Land Rover have partnered to create a new connected car experience, www.thetileapp.com/en-us/connected-car, Feb. 26, 2017, 3 pages.
Bringgr—Helping You Keep Track of What Matters Most, https://www.kickstarter.com/projects/aldobeqiraj/bringrrtm-helping-you-keep-track-of-what-matters-m, Oct. 24, 2016, pp. 5, 7, 9.

* cited by examiner

*Primary Examiner* — Leon Flores
(74) *Attorney, Agent, or Firm* — Jennifer Stec; Brooks Kushman P.C.

(57) ABSTRACT

A vehicle comprising includes lights and a controller. The controller, responsive to reception of signals indicative of an opening and closing of a door of the vehicle, the vehicle being within boundaries of a predetermined locale, and an item being within the vehicle, blinks the lights.

16 Claims, 5 Drawing Sheets

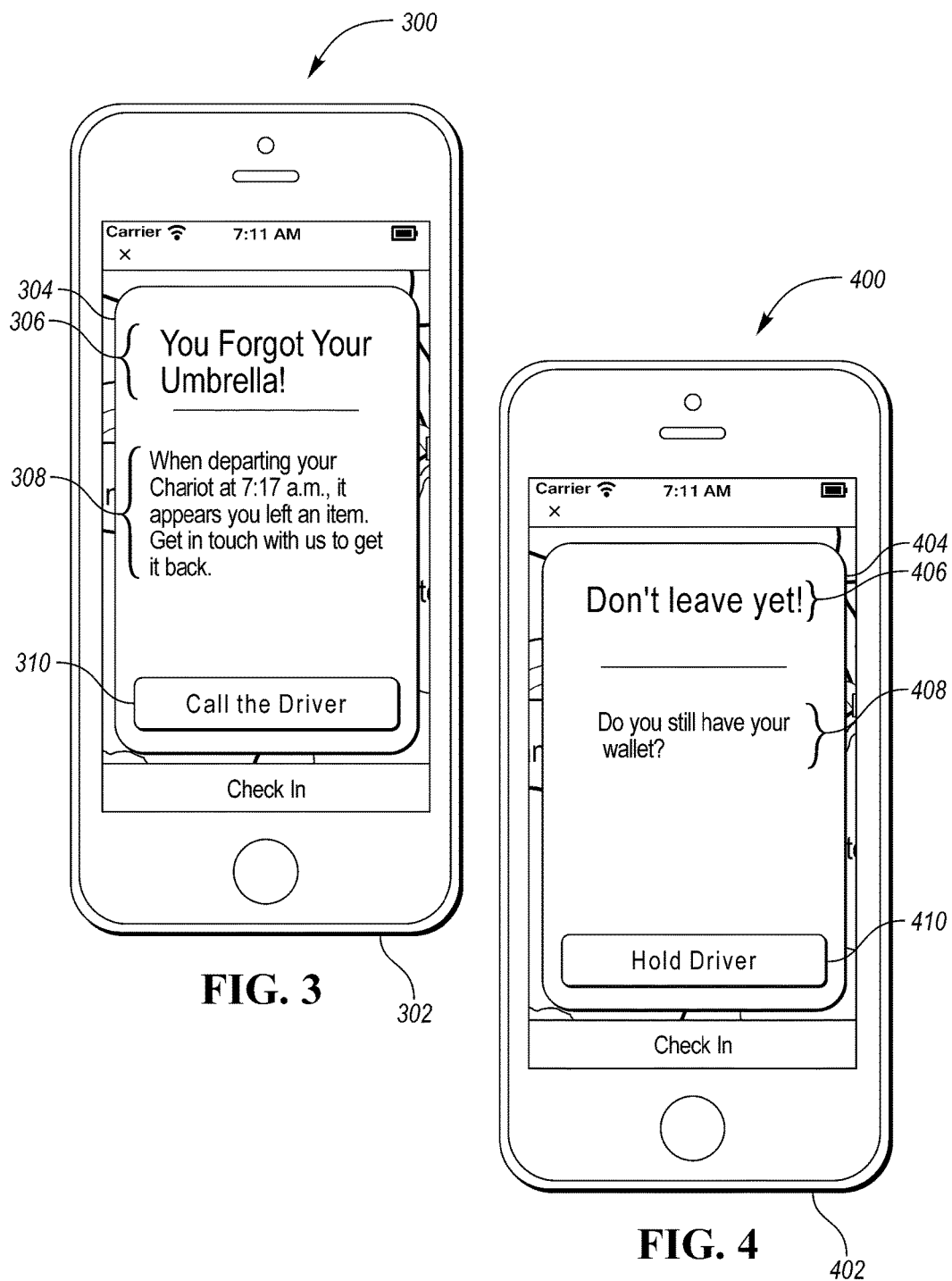

METHOD AND APPARATUS FOR VEHICULAR ITEM TRACKING

TECHNICAL FIELD

This application is generally related to systems and methods to construct and notify changes in item inventory while entering and exiting a vehicle.

BACKGROUND

As personal schedules become increasingly packed, society as a whole becomes increasingly chaotic as individuals hectically travel from place to place. For example, a family may have to balance getting kids ready for school or getting ready for an after-school event while getting oneself or a spouse ready for work while maintaining a residence. Due to these demands, often an individual travels to a destination and after arriving, discovers that they forgot to bring a key item needed. Currently people make a list to remind them, or even place an object in plain sight so they do not forget, only to overlook the item (i.e., article) and still depart either a location or a vehicle without the item.

SUMMARY

A vehicle includes lights and a controller. The controller may be configured to, responsive to reception of signals indicative of an opening and closing of a door of the vehicle, the vehicle being within boundaries of a predetermined locale, and an item being within the vehicle, blink the lights.

A computer-implemented method includes activating, by a controller, a horn of a vehicle responsive to reception of signals indicative of an opening and closing of a door of the vehicle, the vehicle being within boundaries of a predetermined locale, and an item being within the vehicle.

A vehicle includes a chime, passenger compartment lights, and a controller configured to, responsive to reception of signals indicative of a key-on request for the vehicle, the vehicle being within boundaries of a predetermined locale, and an item being within the vehicle, activate the chime and blink the lights.

BRIEF DESCRIPTION OF THE DRAWINGS

FIG. 3 is frontal view a reminder message being displayed on a nomadic device.

FIG. 4 is frontal view a query message being displayed on a nomadic device.

DETAILED DESCRIPTION

Figure 1:
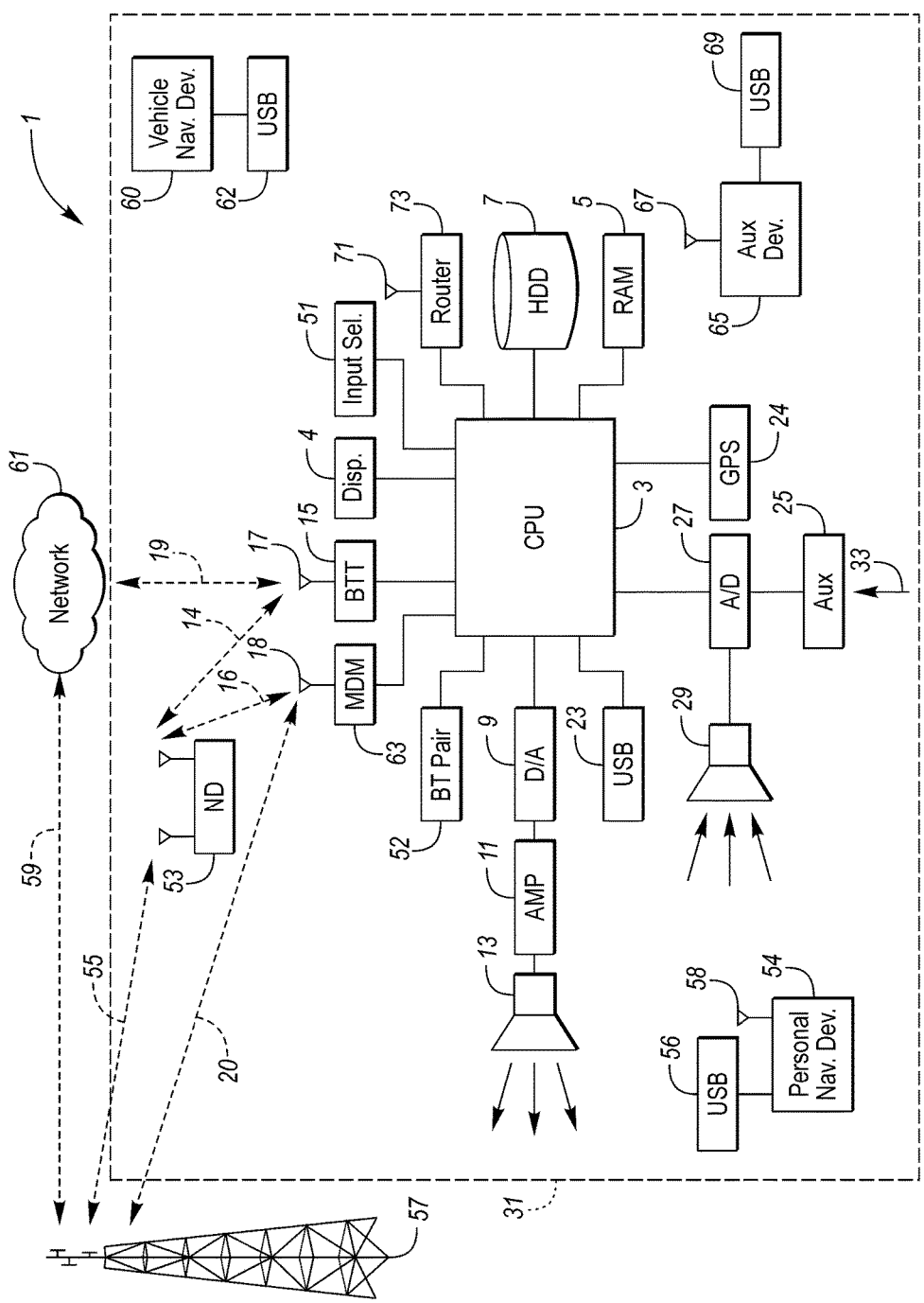
FIG. 1 is schematic diagram of a vehicle computing system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A common problem that people experience is forgetting to bring an item (also referred to as an article) when traveling to a locale or leaving an item behind when departing from a locale. One example of this is driving to work then once at the destination locale (workplace) realizing that you forgot an identification badge, an entry badge, a laptop computer, a tablet computer, a brief case, a wallet/purse, or other item. This problem may be exacerbated if the discovery of the missing item is timely required, e.g. after dining out then not being able to pay a bill, arriving at a workplace just in time for a meeting and not being able to get in without an access card, having to send an emergency email and not having a laptop or tablet, etc. Currently the average person does not use any technology to track and locate their belongings.

Here, an in-vehicle item tracking system and method is disclosed that may be configured to: 1) Remind users of required, predicted, and desired items based on a date, time, location, weather, etc. 2) Record and maintain a list of items found in the vehicle prior to departure, prior to arrival at a locale, or after leaving a vehicle at a destination locale. 3) Remotely scan for items via a controller such as a vehicle system controller (VSC). The key features of this system include, a reminder message sent to customers responsive to required, desired, and predicted items. Also, the system may employ a learning algorithm that will learn over time when and what items are required based on criteria such as a weather forecast (such as a 24-hour weather forecast with a prediction of rain), a day of the week, a time of the day, a locale as determined by a GPS signal, triangulation of radio signals (e.g., cellular towers), vehicular dead reckoning, etc. The system may also allow the user to manually configure the system. For example, the user may choose that they would only like reminders for their laptop and work badge on weekday mornings. The system may also configure itself automatically, by observing the habits of the customer. For example, the system may learn that an Identification badge and laptop are traditionally required during weekdays, so if they are not detected before the vehicle departs from an originating location en-route to a workplace, the system may beep a horn of the vehicle, activate an in-vehicle chime, display a message on an in-vehicle display (e.g., Driver Information Console, infotainment center, instrument cluster, etc.), or send a message to a nomadic device (e.g., Cellular phone, key FOB, tablet, smart watch, etc.). Also, the system may output an audible message, for example the system may output an audible message "have you forgot your wallet? Likewise, the system may recommend an item based on data such as a weather forecast (e.g., a 24-hour forecast), a day of the week, a destination locale, in which the item may include an umbrella, a jacket, boots, bathing suit, a hat, sunglasses, a portable chair, a snack, a water bottle, etc. based on the weather forecast indicative of rain, snow, a cold front, a heat spell, a sunny day, or the destination being an outdoor venue such as an outdoor amphitheater, a park, a hike & bike trail, a beach or swim pool, etc. Alternatively, the customer can specify when they want the system to remind them about specific items. For example, a user can enter items into an application on a nomadic device or a vehicle computing system along with characteristics associated with the items such that they are flagged for display and notification in the event the items are not detected upon departure from a originating location or when exiting the vehicle at a destination location. Also, the system may look at vehicle conditions or vehicle signals including signals from a door switch or a door sensor indicative of an occupant entering or exiting the vehicle.

The system may further be configured to activate the alert based on if someone is entering the vehicle without an item or exiting the vehicle without an item. For example, when exiting the vehicle without an item the system may activate exterior alerts (e.g., vehicle horn, headlights, exterior turn signal lights, running lights, back-up lights, and transmit a message to a nomadic device). While when entering the vehicle without an item the system may activate interior alerts (e.g., interior chime, interior lights, ambient lights, output a message on an in-vehicle display/infotainment system, output an audible message on an infotainment system, and transmit a message to a nomadic device). The system may further operate in response to a signal from a passenger occupant detection system (PODS). For example, when dropping off a child at school, the system may responsive to changes in the door sensor and the PODS indicating that a person left the vehicle, while the location is a school, activate both the interior alert and exterior alert if a school tablet is detected within the vehicle. Also, prior to leaving a residence, the interior alert may be activated if the PODS detects both an operator and passenger without detection of a presence of a pre-programmed item (e.g., backpack, school tablet, cellular phone). These items may use the similar or different wireless frequencies and protocols, for example, the cell phone may be detected via Bluetooth, the school tablet via Wi-Fi, and the backpack via an RFID tag.

The system may also keep a record of items in the vehicle. The logging feature may also include a user supervisor mode to include additional control. This feature may be useful for tracking down lost items. For example, if an item is lost, the user may be able to display the last known location of the item and an associated time. Further, the system may be remotely scan for items based on integration with an infotainment system (e.g., SYNC Connect) that may allow the vehicle to remotely scan for items, and inform the customer immediately upon request. Thus, allowing the user to quickly check if a particular item is in their vehicle from a remote location (e.g., a nomadic device).

The detection of the location of the item in the vehicle may include use of the electromagnetic spectrum including a radio frequency (RF) based system, (e.g., Radio-frequency identification (RFID), Bluetooth, Bluetooth Low Energy (BLE), etc.), a vision based system that scans images (e.g., a digital photograph or digital video) recognizes the item, or the system may be a user prompted system. The RFID systems use electromagnetic fields to automatically identify and track tags attached to items. The tags contain electronically stored information such as an identification number, (e.g., a tag number) and may also include a serial number, a group number, a unit number, or other classification number. RFID tags may be either passive tags, or active tags. Passive tags collect energy from a nearby RFID reader's interrogating electromagnetic waves, this is usually limited to less than one meter in distance and typically in the range of 10 cm. Active tags have a local power source such as a battery and may operate at distances of multiple meters from the RFID reader (e.g., 2 m up to 100 m or more). These systems typically operate at different frequencies, for example, low-frequency (LF) (i.e., frequencies less than 300 kHz) tags may operate at 125-134.2 kHz and/or 140-148.5 kHz) (Low-FID), high-frequency (HF) (i.e., frequencies between 300 kHz-30 MHz) tags may operate at 13.56 MHz (HighFID), very high-frequency (VHF) (i.e., frequencies between 30 MHz-300 MHz) tags and ultra-high-frequency (UHF) (i.e., frequencies between 300 MHz-3 GHz) tags may operate at 865-928 MHz (Ultra-HighFID or UHFID) in one embodiment, UHFID operate between 902-928 MHz (specifically at ±13 MHz from the 915 MHz center frequency). This system is not limited to a single frequency/monitoring type. For example, use of a 134.2 Khz RFID active tag implanted in an animal may be used with a UHFID passive tag for an identification badge, and a low frequency inductive charging system to detect a nomadic device (e.g., mobile phone, smart watch, etc.). Here, the vehicle can inform the user that an animal is in the vehicle (such as a pet dog or cat) and the weather forecast is hot and sunny thereby posing a risk for the animal if left in the vehicle. Or that the user has left the vehicle with the nomadic device charging on an in-vehicle charging system. Lastly, the system may use multiple antennas to triangulate a location of the items RF tag to determine a location of the item. This may also be used to determine if an item has been left on top of the vehicle or has fallen out of the vehicle.

FIG. 1 illustrates an example block topology for a vehicle based computing system 1 (VCS) for a vehicle 31. An example of such a vehicle-based computing system 1 (e.g., an infotainment system) is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLU- ETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a Controller Area Network "CAN bus", and Ethernet bus, FlexRay bus, Local Interconnect Network "LIN bus" or other vehicle communication bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative embodiments, whenever a user wants to travel a route or use a transportation service, the process can use the illustrative embodiments and the like, to determine if parental approval is required before transportation can proceed. So, in the case of a personal vehicle, inputting an impermissible route may require approval before the route guidance will begin. In the case of an on-demand service, the type of service, a planned route or a destination may require approval before the user can actually access a service to hire the vehicle. This can allow guardians to provide their charges with on-demand transportation services, without fear of unapproved rides or destinations. This feature could be integrated into a parental watchdog application or into various on-demand applications directly, among other possible implementations.

Figure 2:
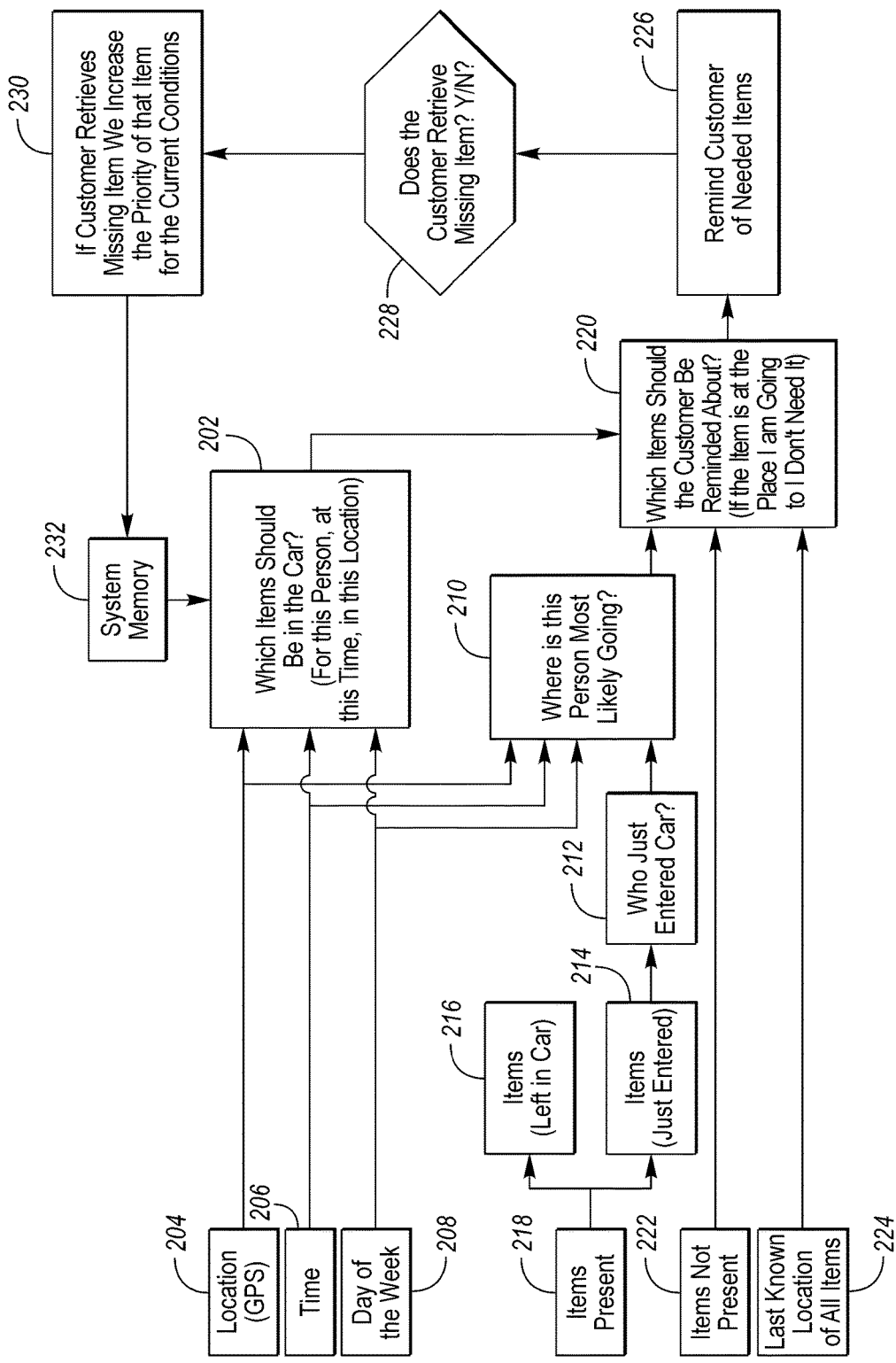
FIG. 2 is a flow diagram of an item tracking system for a vehicle.

FIG. 2 is a flow diagram of an item tracking system for a vehicle. Here at step 202, a controller determines what items should be in the vehicle based on system input including a location 204 that may be based upon a GPS signal, or a dead reckoning algorithm of a vehicular system, a time 206, and a day of the week 208. The controller also predicts based on the input a destination location in step 210.

In step 212, the system predicts who entered the vehicle and then forwards this information to step 210. In step 212, the vehicle may use vision systems, safety systems, or passenger detection systems to determine who is in the vehicle. For example, at 8:00 the vehicle may detect if there is a single passenger (parent going to work) or multiple passengers in the back seat (kids being driven to school) or multiple passengers in the front (ride sharing). The vehicle may also use data from a vehicle bus (e.g., CAN bus or LIN bus) that is indicative of a vehicle door being opened and closed in conjunction with data from a passenger occupancy detection system (PODS) to determine if people are entering or have exited the vehicle. The vehicle may also use a position or a transition of an ignition key or ignition switch.

Based on this information, the system may determine items that have entered the vehicle in step 214, along with items currently in the vehicle in step 216, both based on a database of possible items 218. If multiple passengers in the back seat are detected, the controller may scan for a presence of backpacks along with work items. As the controller may determine that the predicted destination is school followed by work in step 210. The predicted destination determined in step 210 is forward to step 220 in which the controller predicts which items should be in the vehicle and which items does the user wish to be reminded about.

In step 220, the controller also receives data from step 222 that is what items are not present, and step 224 that is a last known location of each item. The controller in step 226 outputs a reminder of the predicted desired items. The reminder includes activating a horn of the vehicle, activating lights of the vehicle (e.g., headlights, exterior turn signal lights, running lights, interior lights, ambient lights), displaying a message on a display in the vehicle, activating a passenger compartment chime, flashing interior lights of the vehicle or changing the interior ambient light color and flashing the interior lights at a distinct color. For example, if the ambient lights are programmed to green, the controller may flash the ambient lights in the red spectrum to indicate that an item is potentially missing, if the ambient light color is already red, the controller may flash a light blue color so the flashes are distinguishable from a standard ambient light color. The controller will continue to monitor the system in step 228 to determine if the missing items are retrieved. If the item is retrieved, the controller will increase a priority of the item in step 230 and store that updated information in system memory in step 232.

FIG. 3 is frontal view a reminder message being displayed on a nomadic device. Here, the system 300 transmits a message from a vehicle to a nomadic device 302 the nomadic device 302 displays the message in a graphic user interface 304 that includes a header 306, details 308, and either a response button 310, or multiple possible responses, such as 1) Dismiss the Message, 2) Call the Driver, 3) Send a Text to the Driver.

FIG. 4 is frontal view a query message being displayed on a nomadic device. Here, the system 400 transmits a message from a vehicle to a nomadic device 402 the nomadic device 402 displays the message in a graphic user interface 404 that includes a header 406, details 408, and either a response button 410, or multiple possible responses, such as 1) Dismiss the Message, 2) Hold the Driver, 3) Call the Driver, 4) Send a Text to the Driver.

Figure 5:
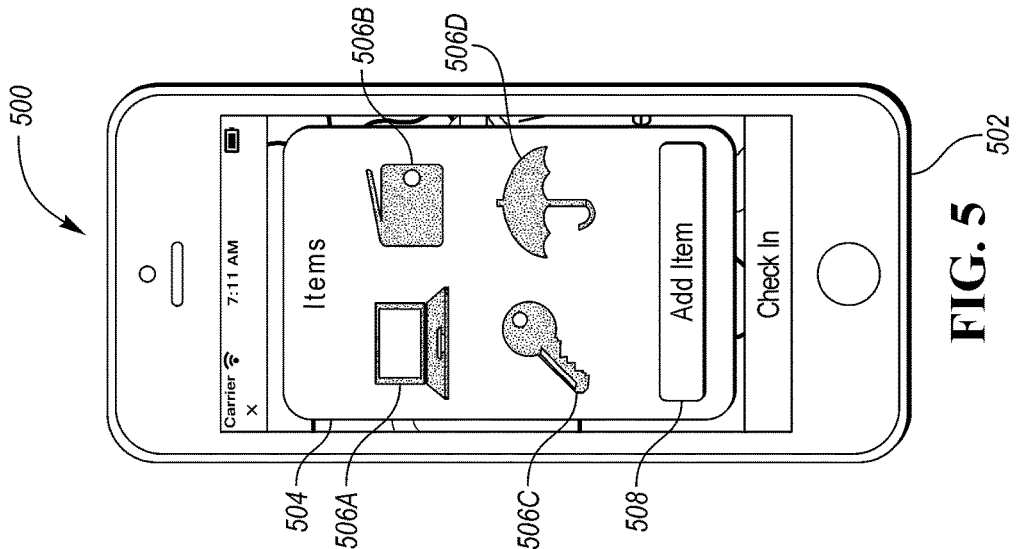
FIG. 5 is frontal view a message indicative of trackable items being displayed on a nomadic device.

FIG. 5 is frontal view a message indicative of trackable items being displayed on a nomadic device. Here, the system 500 transmits a message from a vehicle to a nomadic device 502 the nomadic device 502 displays the message in a graphic user interface 504 that includes an icon of items 506 (e.g., a laptop icon 506A, an identification badge icon 506B, a key icon 506C, and an umbrella icon 506D) and either a response button 510, or multiple possible responses, such as 1) Add Item, 2) Set Item Properties, 4) New Item, 5) Erase Item.

Figure 6:
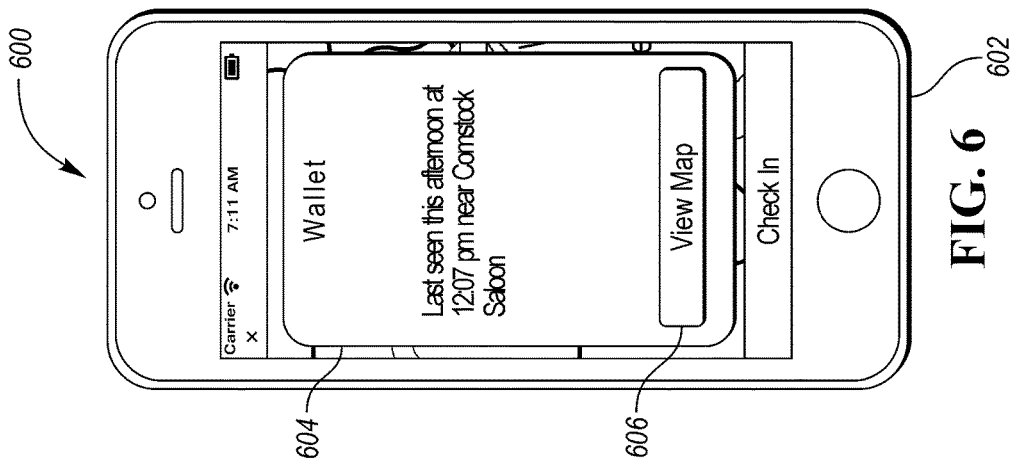
FIG. 6 is frontal view an informative message indicative of a possible location of an item being displayed on a nomadic device.

FIG. 6 is frontal view an informative message indicative of a possible location of an item being displayed on a nomadic device. Here, the system 600 transmits a message from a vehicle to a nomadic device 602 the nomadic device 602 displays the message in a graphic user interface 604 that includes a header, details, and either a response button 606, or multiple possible responses, such as 1) View Map, 2) Call the Location, 3) Dismiss the Message. Here, the system may, based on searching a remote database, determine a business or household associated with the last known location and based upon the location determine a phone number to call so the user can attempt to retrieve the item.

Figure 7:
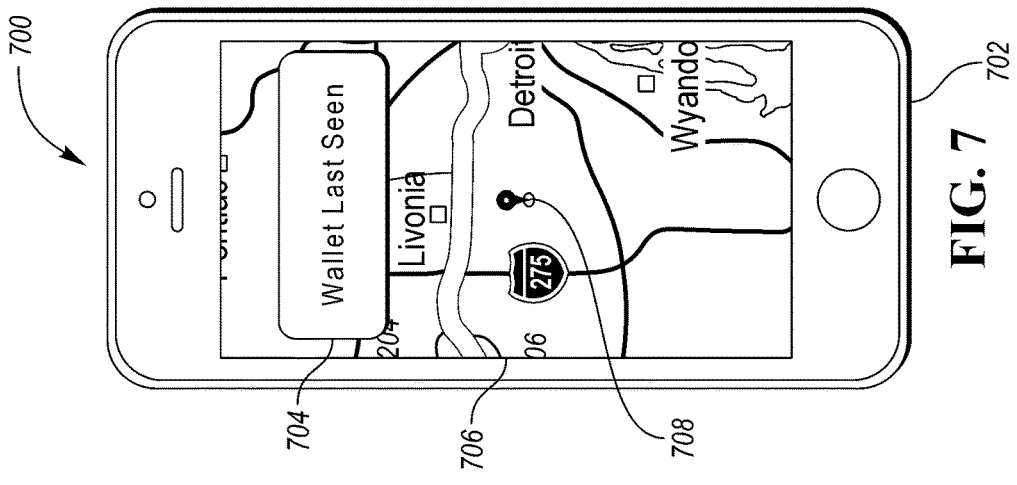
FIG. 7 is frontal view a geographic message indicative of a possible location of an item being displayed on a nomadic device.

FIG. 7 is frontal view a geographic message indicative of a possible location of an item being displayed on a nomadic device. Here, the system 700 transmits a message from a vehicle to a nomadic device 702 the nomadic device 702 displays the message in a graphic user interface 704 that includes a map 706, and either a location 708

Figure 8:
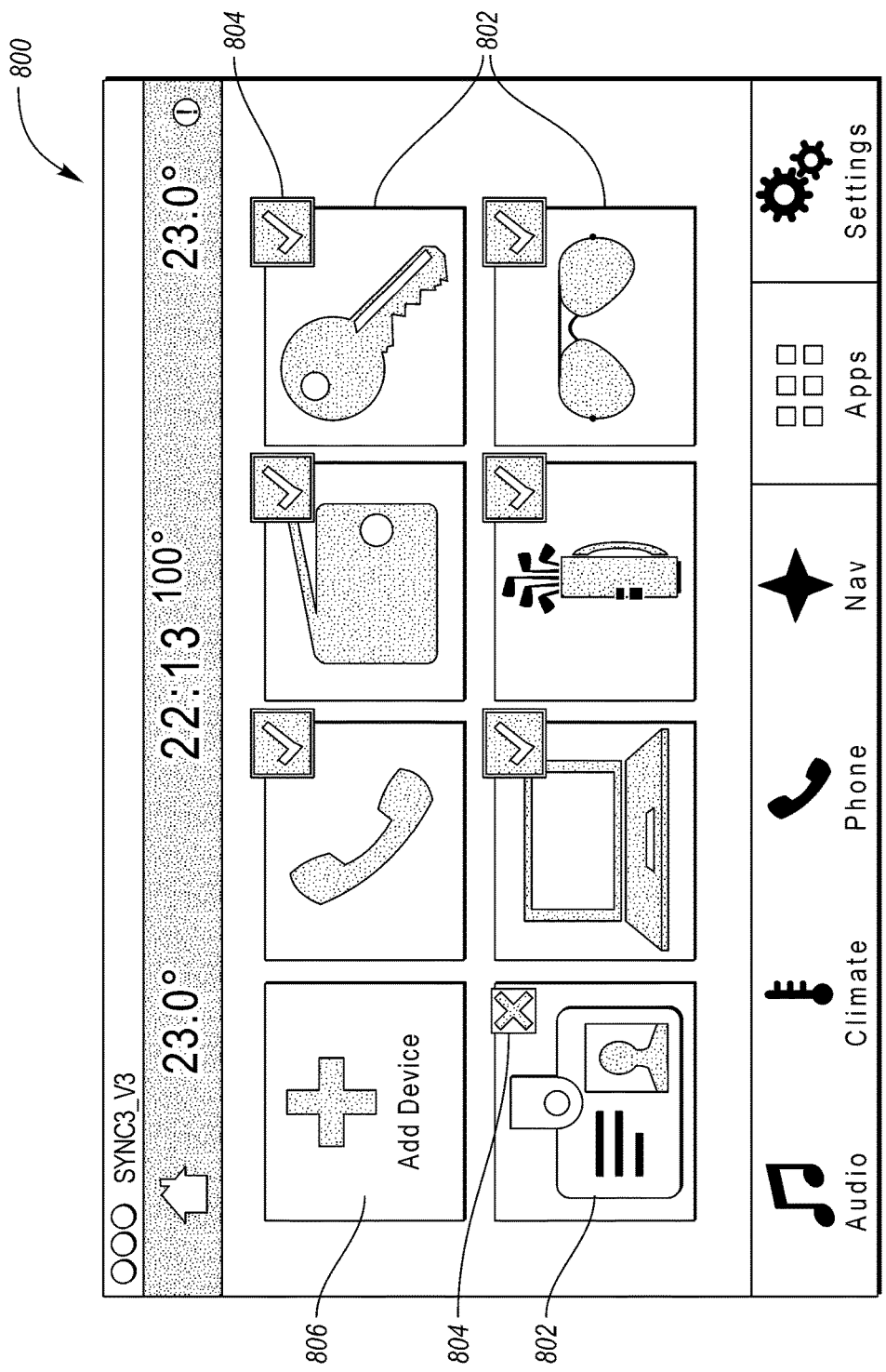
FIG. 8 is frontal view a message indicative of trackable items being displayed on a vehicular computing system.

FIG. 8 is frontal view a message indicative of trackable items being displayed on a vehicular computing system.

Here, the system 800 displays, via a graphic user interface, icons of items 506 (e.g., a laptop icon, an identification badge icon, a key icon, a mobile phone icon, etc.), in which each item includes a select/deselect soft key 804, and a function soft key 806, or multiple possible function soft keys, such as 1) Add Item, 2) Edit Item Properties, 4) New Item, 5) Erase Item.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   lights;
   a controller configured to, responsive to reception of signals indicative of an opening and closing of a door of the vehicle, the vehicle being within boundaries of a predetermined locale, and an item being within the vehicle, blink the lights; and
   an inductive charge coil, wherein the signals indicative of the item being within the vehicle are based on a nomadic device being inductively coupled with the charge coil.

2. The vehicle of claim 1, wherein the controller is further configured to, responsive to reception of signals indicative of an opening and closing of a door of the vehicle, the vehicle being within boundaries of a predetermined locale, and an article being within the vehicle, blink the lights.

3. The vehicle of claim 2, wherein the signals indicative of the item being within the vehicle are at frequencies distinct from the signals indicative of the article being within the vehicle.

4. The vehicle of claim 2, wherein the signals indicative of the item being within the vehicle are ultra-high frequencies and the signals indicative of the article being within the vehicle are low frequencies.

5. The vehicle of claim 1, wherein the predetermined locale is a home, store, or a workplace.

6. The vehicle of claim 5, wherein the item is a wallet, nomadic device, or identification badge.

7. The vehicle of claim 1, wherein the controller is further configured to, responsive to reception of the signals, transmit a wireless message to a nomadic device.

8. The vehicle of claim 7, wherein the transmission of the wireless message is further responsive to signals indicative of a weather forecast.

9. The vehicle of claim 1, wherein the lights are headlights, exterior turn signals, or back-up lights.

10. The vehicle of claim 9, wherein the lights are interior ambient lights configured to illuminate at a set color, and blinking the lights includes activating the interior ambient lights at a color different than the set color.

11. A computer-implemented method comprising:
activating, by a controller, a horn of a vehicle responsive to reception of signals indicative of an opening and closing of a door of the vehicle, the vehicle being within boundaries of a predetermined locale, and an item being within the vehicle; and
transmitting, by the controller, a wireless message to a nomadic device responsive to reception of the signals indicative of the opening and closing of a door of the vehicle, and reception of signals indicative of a weather forecast.

12. The method of claim 11 further comprising transmitting a wireless message to a nomadic device responsive to reception of the signals.

13. The method of claim 11 further comprising activating the horn responsive to reception of signals indicative of an opening and closing of a door of the vehicle, the vehicle being within boundaries of a predetermined locale, and an article being within the vehicle.

14. The method of claim 13, wherein the signals indicative of the article being within the vehicle are at frequencies distinct from signals indicative of the item being within the vehicle.

15. A vehicle comprising:
a chime;
passenger compartment lights; and
a controller configured to, responsive to reception of signals indicative of a key-on request for the vehicle, the vehicle being within boundaries of a predetermined locale, an item not being within the vehicle, and an article not being within the vehicle, blink the lights,
wherein the signals indicative of the article not being within the vehicle are low frequency signals and the signals indicative of the item not being within the vehicle are ultra-high frequency signals.

16. The vehicle of claim 15, wherein the controller is further configured to, responsive to reception of signals indicative of a key-on request for a vehicle, the vehicle being within boundaries of a predetermined locale, and the item not being within the vehicle, output an audible message.

* * * * *